Nov. 27, 1951 S. S. HILL 2,576,115

ARRANGEMENT FOR TRANSMITTING ELECTRIC SIGNALS OCCUPYING
A WIDE FREQUENCY BAND OVER NARROW BAND CIRCUITS

Filed Feb. 4, 1948

INVENTOR
STUART S. HILL

BY Robert Harding Jr.

ATTORNEY

Patented Nov. 27, 1951 2,576,115

UNITED STATES PATENT OFFICE 2,576,115

ARRANGEMENT FOR TRANSMITTING ELECTRIC SIGNALS OCCUPYING A WIDE FREQUENCY BAND OVER NARROW BAND CIRCUITS

Stuart Seymour Hill, London, England, assignor to International Standard Electric Corporation, New York, N. Y., a corporation of Delaware Application February 4, 1948, Serial No. 6,316
In Great Britain February 7, 1947

13 Claims. (Cl. 178—44)

Figures 1, 2:
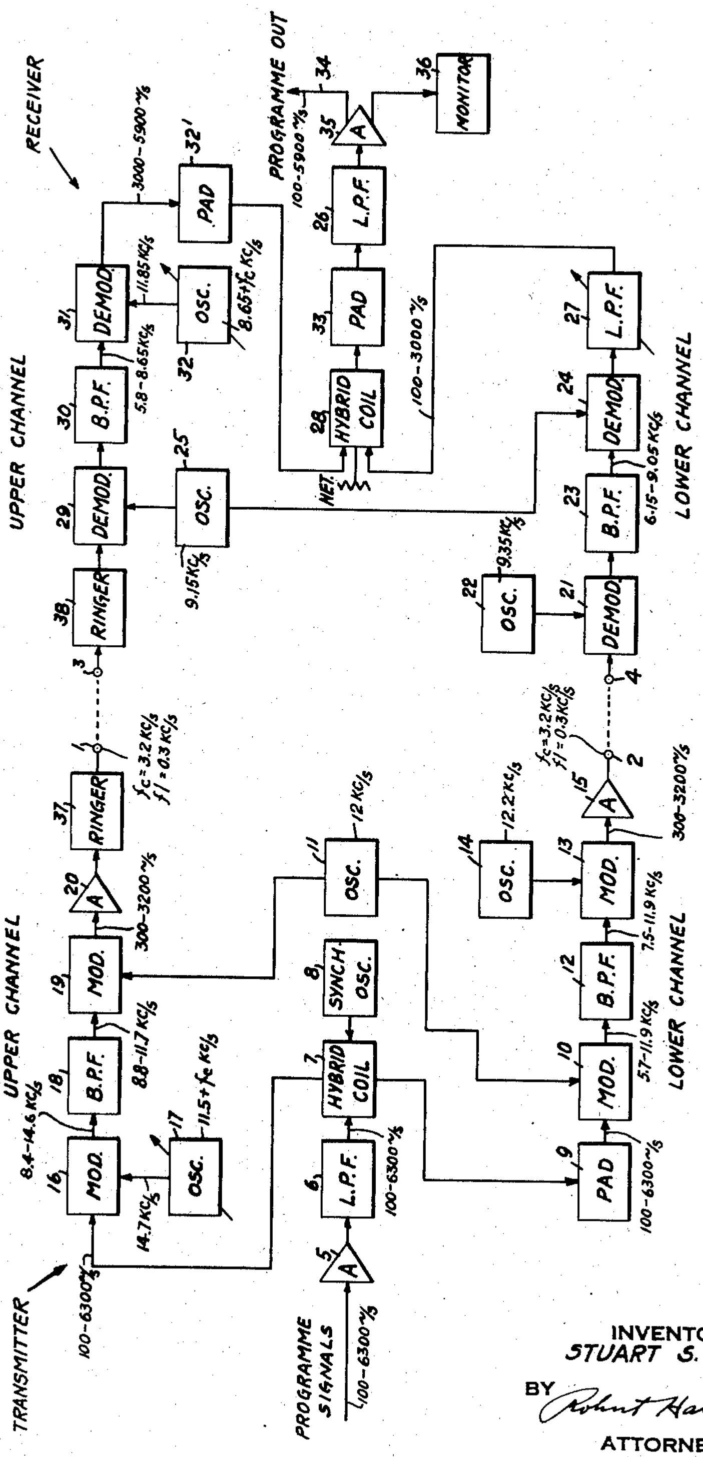

The present invention relates to electric signal transmission systems of the kind in which signals occupying a relative wide frequency band are transmitted over two or more circuits each of which is capable of transmitting only a relatively narrow frequency band.

The invention has its principal application to broadcasting circuits.

It is frequently necessary to send broadcast material to the studios by telephone line. Sometimes special broadcast channels designed for a wide frequency band with low noise and distortion are available, or ordinary open wire lines can perhaps be specially equalised for a given occasion. Very often, however, only narrow band commercial telephone channels will be available. Such channels may, for example, pass a band from about 300 to 3,000 cycles per second, while the broadcast band which it is desired to transmit may extend from about 100 to 6,000 cycles per second.

It has therefore already been proposed to split the wide broadcast band into two sections, which after the necessary frequency shifts are transmitted separately over two different commercial or other narrow band telephone circuits, and are then recombined at the receiving end after the necessary frequency transfers.

It has been found, however, that in the arrangements so far proposed, the transmitter and receiver circuits have to be specially designed for the particular band-width passed by the telephone channels which will be used, because the receiver frequency shifts necessary for the proper recombining of the two parts of the band depend on this band-width. In other words, if the circuits are designed for telephone channels with a given band-width, they cannot be satisfactorily used with channels having a different band-width.

It is therefore the principal object of the present invention to overcome this difficulty, and to provide an arrangement which can be easily adapted for use with telephone channels of various band-widths.

This object is achieved according to the invention by providing an arrangement for transmitting an electric signal occupying a relatively wide frequency band over a plurality of communication channels each of which is capable of passing only a relatively narrow frequency band, comprising means for dividing the signal band into a plurality of sections of widths corresponding respectively to the widths of the bands passed by the said channels, means for frequency shifting each of one or more sections to the frequency range passed by the corresponding channel and means for transmitting the frequency shifted sections over the respective channels, characterised in this, that the frequency shifting means in the case of at least one section comprises two successive frequency changes, one of which employs a fixed carrier frequency and the other a carrier frequency which is adjusted to a value determined by the cut-off frequency of the corresponding channel.

The invention will be described with reference to the accompanying drawings, Figs. 1 and 2 of which respectively show block schematic circuit diagrams of the transmitting and receiving arrangements of a system according to the invention. Terminals 1 and 2 of Fig. 1 are intended to be connected respectively to terminals 3 and 4 of Fig. 2 by separate telephone or other relatively narrow band circuits or lines. The system to be described will be assumed to be designed to meet a particular series of requirements, but it should be understood that it may be adapted for other requirements. None of the frequency ranges given below are intended to set limitations to the system, and are only quoted for the sake of example, and may be extended without any difficulty.

It will be assumed that the broadcast band which it is desired to cover extends from 100 to 6,000 cycles per second, and that the commercial telephone channels cover a band from about 300 to 3,000 cycles per second. It will further be assumed that the commercial telephone circuits likely to be available may have upper cut-off frequencies which may lie anywhere between about 2,700 and 3,200 cycles per second. The upper cut-off frequency of the commercial circuits will be denoted by $fc$.

At the transmitting end of the system the programme signals covering the wide band are amplified in a preamplifier 5 and are then passed through a clean-up low pass filter 6 which removes those upper frequencies which the system cannot be expected to transmit. This filter will therefore limit the band between 100 and about 6,300 cycles per second. The limited band of frequencies is then supplied in parallel to upper and lower channels through a conventional hybrid coil network 7, the place of the balancing impedance being taken by a synchronising oscillator 8 to be described later. This hybrid coil network prevents appreciable interaction between the two channels. The band is then applied in the lower channel through the attenuating pad 9 to a modulator 10 supplied with a carrier wave of frequency 12 kc./s. from an oscillator 11, the lower side band extending from 5.7 to 11.9 kc./s. being selected by a filter 12 which also attenuates frequencies up to about 7.5 kc./s. for the purpose of minimising programme leak through the modulator. The pad 9 may introduce an attenuation of about 12 decibels, and is provided in order to ensure that both channels are operated at about the same level. In the programme band the middle and lower frequencies predominate, and so without the pad 9 the lower channel would be at a much higher level than the upper channel and there would then be danger of the introduction of excessive noise into the upper channel.

The lower sideband from the filter 12 is applied to a second modulator supplied with a carrier wave of 12.2 kc./s. from an oscillator 14 the output of which is applied through an amplifier 15 to the commercial channel connected to terminal 2, which channel is assumed to cut off at about 3.2 kc./s. and so selects part of the lower sideband. The highest frequency of the sideband applied to the second modulator 13 (11.9 kc./s.) appears as 300 cycles in the finally transformed band. The highest frequency of the original wide input band which is passed through the lower channel is 3 kc./s., and this appears as 9 kc./s., after the first modulation, and 3.2 kc./s. after the second. Frequencies above 3.2 kc./s. will be attenuated by the commercial channel, though there may be some transmission up to about 4.7 ks./s., corresponding to 4.5 kc./s. in the original input band. Thus there is some transmission on the frequencies between 3 and 4.5 kc./s. of the signal band. However, any frequencies in the range 3.2 to 4.7 kc./s. which may be actually transmitted by the commercial channel are further attenuated at a later stage, in the receiving terminal.

It will be seen that the effect of the two modulations is to raise all the frequencies in the lower part of the band by 200 cycles per second (the difference between the frequencies of the two oscillators). Frequencies in the upper part of the band have been partly removed by the line and partly by the high pass section of the filter 12 between the two modulators 10 and 13.

The modulation process in the upper channel will now be explained. The original wide input programme band is applied from the hybrid coil network 7 to a first modulator 16 supplied with carrier waves from an oscillator 17 of adjustable frequency. If $fc$ is the cut-off frequency of the telephone channels, then this oscillator should be set to a frequency of $11.5+fc$ kc./s. In the particular case chosen in which $fc$ is 3.2 kc./s., the frequency supplied to the first modulator 16 should therefore be 14.7 kc./s. The lower side band extends from 8.4 to 14.6 kc./s., and is passed through a filter 18 having a pass band extending from 8.8 to 11.7 kc./s., which removes the upper side band, and in addition attenuates frequencies up to 6 kc./s., that is those frequencies which might appear owing to programme leak. The portion of this lower side band passed by the filter 18 is applied to a second modulator 19 supplied with a carrier wave of frequency of 12 kc./s. from the oscillator 11 which supplies the first modulator 10 in the lower channel. The lower sideband, covering the range 300 to 3,200 cycles per second, is supplied through an amplifier 20 to the second telephone channel connected to terminal 1. Frequencies between 6 and 8.8 kc./s., which are not much attenuated by the filter 18 might also appear at the output of the second modulator 19 as a band from 3.2 to 6 kc./s. Only a small portion of this band is however present in the first lower sideband at 8.4 to 8.8 kc./s.

The effect of the two modulations in the upper channel has therefore been to remove that portion of the original programme band which is dealt with by the lower channel, and to shift the upper frequencies of the band downwards by 2.7 kc/s., the difference between the frequencies of the two oscillators.

At the receiving terminal shown in Fig. 2, the band of frequencies of the lower channel which arrive over the line connected to terminal 4 are applied to a first demodulator 21 supplied with a carrier frequency of 9.35 kc./s. from an oscillator 22. A filter 23 removes the upper sideband and programme leak, and delivers the lower sideband to a second demodulator 24 supplied with a carrier frequency from an oscillator 25 at 9.15 kc./s. The lower sideband from the demodulator 24 covers the range 100 to 3,000 cycles per second of the original signal band. Besides the unwanted upper sideband (*a*) which covers the range 15 to 17.9 kc./s., there will be a small programme leak (*b*) in the range 5.85 to 8.75 kc./s. and also those frequencies (*c*) immediately above 3.2 kc./s. which have not been effectively removed by the filters 6 and 12.

The frequencies (*a*) and (*b*) are removed by a suitable low pass filter 26 in the output circuit in which the bands from the lower and upper channels are recombined. The frequencies (*c*) may beat with frequencies legitimately transmitted over the upper channel. An additional simple lowpass filter section 27 is therefore included in the lower branch after the second demodulator 24 for the purpose of attenuating these frequencies sufficiently to render them innocuous. The filter 27 also prevents intermodulations between the high frequency products which may pass between the upper and lower channels on account of the imperfections of the hybrid coil network 28 which, as will be explained presently, is used to combine the two parts of the programme band at the receiving end.

The upper frequency band 300 cycles to 3,200 kc./s. which arrives over the line connected to terminal 3 is shifted to the range 3 to 5.9 kc./s. by two successive demodulations. The first demodulator 29 is supplied with carrier waves at a frequency of 9.15 kc./s. from the oscillator 25 which supplies the demodulator 24 in the lower channel. The lower sideband covering the range 5.8 to 8.65 kc./s. is selected by the band pass filter 30 and delivered to the second demodulator 31 supplied from an adjustable oscillator 32 providing carrier waves at a frequency of $8.65+fc$ kc./s., which for the present case in which $fc$ is 3.2 kc./s. will be 11.85 kc./s.

The two bands 100 to 3,000 cycles and 3,000 to 5,900 cycles obtained respectively from the filter 27 and demodulator 31 are re-united by the hybrid coil network 28 already referred to, arranged so that the upper and lower channels are conjugate, so that intermodulation between these channels is substantially prevented. An attenuating pad 32' corresponding to the pad 9 and introducing the same attenuation (e. g. 12 decibels) is introduced in the upper channel between the demodulation 31 and the hybrid coil network 28 to restore the two sections of the programme band to the proper relative levels.

An attenuating pad 33 introducing for example about 6.5 decibels may be included if desired in the common output channel between the hybrid coil network 28 and the filter 26 already mentioned, and the programme band may be delivered to the output conductor 34 through a suitable amplifier 35.

It will be understood that the adjustable oscillators 17 and 32 supplying the first modulator 16 at the transmitting end, Fig. 1 and the second demodulator 31 at the receiving end Fig. 2 of the upper channel will be set to provide frequencies determined by the cut off frequency of the telephone channels which will be used. If for example this cut off frequency is only 2.7 kc./s., the frequencies of the oscillators will be respectively 14.2 and 11.35 kc./s. and the programme band which can be transmitted over the two telephone channels will be correspondingly reduced to the range 100 to 4,900 cycles per second.

Besides adjusting the oscillators in accordance with the cut-off frequency of the telephone channels it will also be necessary to adjust the filter 27 (Fig. 2) used for preventing intermodulation between the upper and lower channels. As this filter can be quite simple this will cause no difficulty.

The oscillators used to supply the modulators should be of a very stable and accurate type, and in order to avoid distortion it is necessary to ensure that the oscillators at the receiving end Fig. 2 are correctly set so that the overall tone translation effect is zero within a tolerance of perhaps $\pm 5$ cycles. For this purpose, the oscillator 8 (Fig. 1) is provided for transmitting over the system a complex wave at a frequency of, say, 1 kc./s. with prominent 2nd and 4th harmonics. The fundamental and second harmonic pass over the lower branch, and the fourth harmonic passes over the upper branch. The received complex tone after recombination at the receiver (Fig. 2) is applied to a monitoring device 36 connected to the output of the amplifier 35, which device includes selective circuits which pick out the three frequencies and a small oscillograph. The three frequencies are applied in pairs to the deflecting plates of the oscillograph, and a stationary figure will be obtained only when the tone translation effect is zero. The oscillators at the receiving end are slightly adjusted to produce this result.

If desired, ringing and telephone circuits 37 and 38 may be provided in the upper branch at the transmitting and receiving ends, between the telephone channel and the modulating or demodulating equipment in each case. These circuits permit the operators to communicate with one another when making the initial arrangements for the broadcast. These circuits are of known type and should preferably be designed to render ineffective the broadcast equipment of the upper channel during ringing and conversation by the operators. By employing the upper channel conversation would be possible without interrupting a broadcast, the quality of which would, however, be temporarily impaired by removal of the upper part of the band.

The frequencies chosen for the oscillators 11 and 25 of Figs. 1 and 2 are not very critical, and other values could be used. The frequency 12 kc./s. for the oscillator 11 was selected to be about double the maximum frequency of the broadcast band to be transmitted, in order to minimise programme leak. The frequency 12.2 kc./s. for the oscillator 14 then follows since a frequency shift of 200 cycles per second is required for the lower part of the band. The frequency $11.5+fc$ for the oscillator 17 is determined in the following way. The width of the band passed by the commercial circuits is $fc-0.3$ kc./s. and therefore the broadcast band must be divided at the frequency $$fc-0.3+0.1 \text{ kc./s.}=fc-0.2 \text{ kc./s.}$$

Hence the maximum frequency of the upper portion of the broadcast band which can be transmitted over the upper channel is $2fc-0.5$ kc./s. This has to be transferred by the double modulation to $fc$ and so since the oscillator 11 is used to supply a frequency of 12 kc./s. to the modulator 19, it follows that the frequency of the oscillator 17 must be $12+fc-0.5=11.5+fc$ kc./s.

The derivation of the fixed frequency portion of the frequency of the oscillator 11 may be further explained as follows:

Let $fb$=the frequency defining the lower limit of the wide-broadcast band.

Let $fc$=the upper cut-off frequency of the commercial channel.

Let $fl$=the frequency defining the lower limit of the commercial channel.

Let 02=the frequency of the second oscillator of the upper channel.

Let X=a fixed frequency.

Then $X+fc$=the frequency of the first oscillator of the upper channel.

X may then be written in terms of 02 and the frequency defining the upper limit of the wide-broadcast band, as determined by $fc$.

The derivation may be as follows:

$fc-fl$=width of band passed by commercial channel.

$fc-fl+fb$=point of division between upper and lower channels of wide-broadcast band.

$(fc-fl+fb)+(fc-fl)=2fc+fb-2fl$=The frequency defining the upper limit of the wide-broadcast band which can be transmitted over these two channels.

Now:

The frequency of the first oscillator—the frequency defining the upper limit of the wide-broadcast band=intermediate frequency.

And:

The frequency of the second oscillator—the intermediate frequency=$fc$

Or:

The intermediate frequency=$02-fc$

Then:

$$(X+fc)-(2fc+fb-2fl)=02-fc$$
$$X=02+fb-2fl$$

In this equation if 12 kc. is substituted for 02, .1 kc. for $fb$, and .6 kc. for $2fl$, $X$ will=11.5, the value of the fixed frequency indicated.

The frequency for the oscillator 25 (Fig. 2) is also determined by programme leak considerations. It can be shown that to avoid programme leak in the demodulator 31, the frequency of the oscillator 25 should be greater than $3fc-0.5$ kc./s., and therefore, in the case chosen, in which the maximum value of $fc$ is 3.2 kc./s. the minimum value for the frequency of the oscillator 25 will be 9.1 kc./s. A larger value than this could be used, and the value actually chosen, namely 9.15 kc./s. was selected to suit a particular filter which was available. The frequencies of 9.35 kc./s. for the oscillator 22 and $8.65+fc$ kc./s. for the oscillator 32 follow from the value 9.15 kc./s. selected for the oscillator 25, in order to obtain the necessary shifts to restore the sections of the broadcast band to their proper positions.

It will be clear that a broadcast band could be split into more than two sections for separate transmission over a similar number of different commercial circuits, means being provided according to similar principles for conveniently adjusting the frequency changing arrangements in accordance with the pass band of the commercial circuits. While the arrangement has been primarily applied to the transmission of broadcast programme signals, it could be used for transmitting any type of signals occupying a wide band over two or more narrow band circuits, for any desired purpose.

What is claimed is:

1. An electric signal receiving arrangement for receiving signals having frequencies lying within a wide band and which are transmitted over a plurality of channels each having a signal pass band narrower than said wide band wherein signals having frequencies within at least one band portion of said wide band, which portion is adjustable with respect to the pass-band characteristics of said channels, are converted to a band of frequencies capable of being transmitted over a selected one of said channels, comprising means for receiving signals transmitted over another of said channels and for restoring the received signals back to the corresponding band portion of said wide band, means for receiving signals transmitted over said one channel, means including a first oscillator adjusted to oscillate at a predetermined frequency for restoring said last mentioned signals back to said one band of said wide band, said last-mentioned means comprising means for converting said last-mentioned signals to a new band of frequencies, said converting means including a second oscillator adjusted to oscillate at a frequency equal to the sum of the cut-off frequency of said one channel plus a fixed frequency which is a function of the frequency of oscillation of said first oscillator and the frequencies defining the lower limits of said wide band of frequencies and the pass band of said one channel, and means for converting the signals having frequencies within said new band to signals having frequencies within said one band portion, and combining means connected to the output of each of said receiving and restoring means to reform said wide band of frequencies.

2. A broad band electric signal transmission system including a transmitting arrangement for transmitting an electric signal occupying a relatively wide frequency band over a plurality of communication channels each of which is capable of passing only a relatively narrow frequency band, said arrangement being adjustable for use with channels having different pass-band characteristics, comprising means for dividing the signal band into a plurality of sections of widths corresponding respectively to the widths of the bands passed by said channels, means for frequency shifting at least one of said sections to the frequency range passed by the corresponding channel, means for transmitting the frequency shifted section over the corresponding channel, the frequency shifting means for said one section comprising two successive frequency changing stages, one of said stages having means for generating a fixed carrier frequency, the other stage having means for generating a carrier frequency adjustable to a value determined by the cut-off frequency of said corresponding channel, the fixed carrier frequency and the frequencies defining the lower limits of the wide band of frequencies and the pass band of the corresponding channel.

3. A broadband electric signal transmission system according to claim 2 further comprising a receiving arrangement connected to said channels comprising means for frequency shifting each of said sections back to the corresponding frequency range of said wide frequency band, and means for combining the restored sections to reform said wide frequency band, said frequency shifting means at the receiver for said one section comprising two successive frequency changing stages, one of said stages having means for generating a fixed carrier frequency, the other stage having means for generating a carrier frequency adjustable to a value determined by said cut-off frequency of said corresponding channel.

4. A system according to claim 2 in which said dividing means is adapted to divide said wide frequency band into two sections for transmission over two narrow band channels, said frequency shifting means comprising means including two frequency changing stages for shifting the lower frequency section upwards to occupy the band passed by one channel and means including two frequency changing stages for shifting the upper frequency section downwards to occupy the band passed by the other channel.

5. A system according to claim 4 in which both of the two last-mentioned frequency shifting means for the two channels include common means for generating a common fixed carrier frequency.

6. A system according to claim 2 in which the signals occupying the wide band are coupled to said frequency shifting means through a hybrid coil network.

7. A system according to claim 2 further comprising a receiving arrangement connected to said two narrow band channels comprising two frequency changing stages for shifting back the lower frequency section to the frequency range originally occupied thereby, and two further frequency changing stages for shifting back the upper frequency section to the frequency range originally occupied thereby, in which the two further frequency changing stages have means for generating respectively carrier frequencies one of which is fixed and the other adjustable to a value determined by the upper cut-off frequency and in which the first mentioned frequency changing stages both have means for generating fixed carrier frequencies, the carrier generating means of one of said first mentioned frequency changing stages constituting the fixed frequency carrier generating means of one of the further frequency changing stages.

8. A system according to claim 7 in which the transmitting arrangement includes means for attenuating the frequencies of the lower section before transmission over the corresponding channel to equalize the levels of the bands transmitted over the two channels, and in which the receiving arrangement includes means for attenuating the frequencies of the upper section by the same amount for restoring the relative levels of the two sections before recombination.

9. A system according to claim 8 in which there is provided at the receiver a hybrid coil network connected to the output of the last stages of both said first and second mentioned frequency changing stages, whereby the two sections of the wide band are recombined after frequency restoration, and means for connecting the output of said network to a common output channel.

10. A system according to claim 2 further comprising a receiving arrangement including means responsive to frequencies within said two sections for comparing the overall frequency shifts produced by the transmission of the two sections respectively over the said channels.

11. A system according to claim 2 in which the said comparing means comprises an oscillator connected to the input of said frequency shifting means in the transmitting arrangement and adapted to supply a given fundamental frequency accompanied by strong second and fourth harmonics chosen so that the fundamental and second harmonic lie in the band occupied by the lower section, and so that the fourth harmonic lies in the other band, said receiving arrangement including a monitoring device adapted to compare the frequencies of the said fundamental frequency and harmonics as received.

12. An electric signal transmitting arrangement for transmitting signals having frequencies lying within a wide band over a plurality of channels each having a signal pass-band narrower than said wide band, said arrangement being adjustable for use with channels having different pass-band characteristics, comprising means for selecting and transmitting signals having frequencies within a first portion of said wide band over a first of said channels, and means for transmitting signals having frequencies within a second portion of said wide band over a second of said channels, said last-mentioned means comprising a first oscillator for converting said last-mentioned signals to a new band of frequencies, and means including a second oscillator and a pass-band filter for converting the signals having frequencies within said new band of frequencies to frequencies passed by said second channel, said first oscillator being adjusted to oscillate at a frequency equal to the sum of the cut-off frequency of said second channel and a fixed frequency which is a function of the frequency of said second oscillator, the frequency defining the lower limit of said wide band of frequencies, and the frequency defining the lower limit of the signal pass-band of said second channel, whereby the limits of the second portion of said wide band will be determined by the pass-band characteristics of said second channel.

13. An electric signal transmitting arrangement according to claim 12 in which the fixed frequency portion of the frequency of said first oscillator is equal to the frequency of said second oscillator plus the frequency defining the lower limit of the wide band of signals minus twice the frequency defining the lower limit of the signal pass band of the second channel.

STUART SEYMOUR HILL.

REFERENCES CITED

The following references are of record in the file of this patent:

UNITED STATES PATENTS

| Number | Name | Date |
|---|---|---|
| 1,595,135 | Affel | Aug. 10, 1926 |
| 1,812,405 | Ives | June 30, 1931 |
| 2,407,213 | Tunick | Sept. 3, 1946 |